Patented Aug. 15, 1950

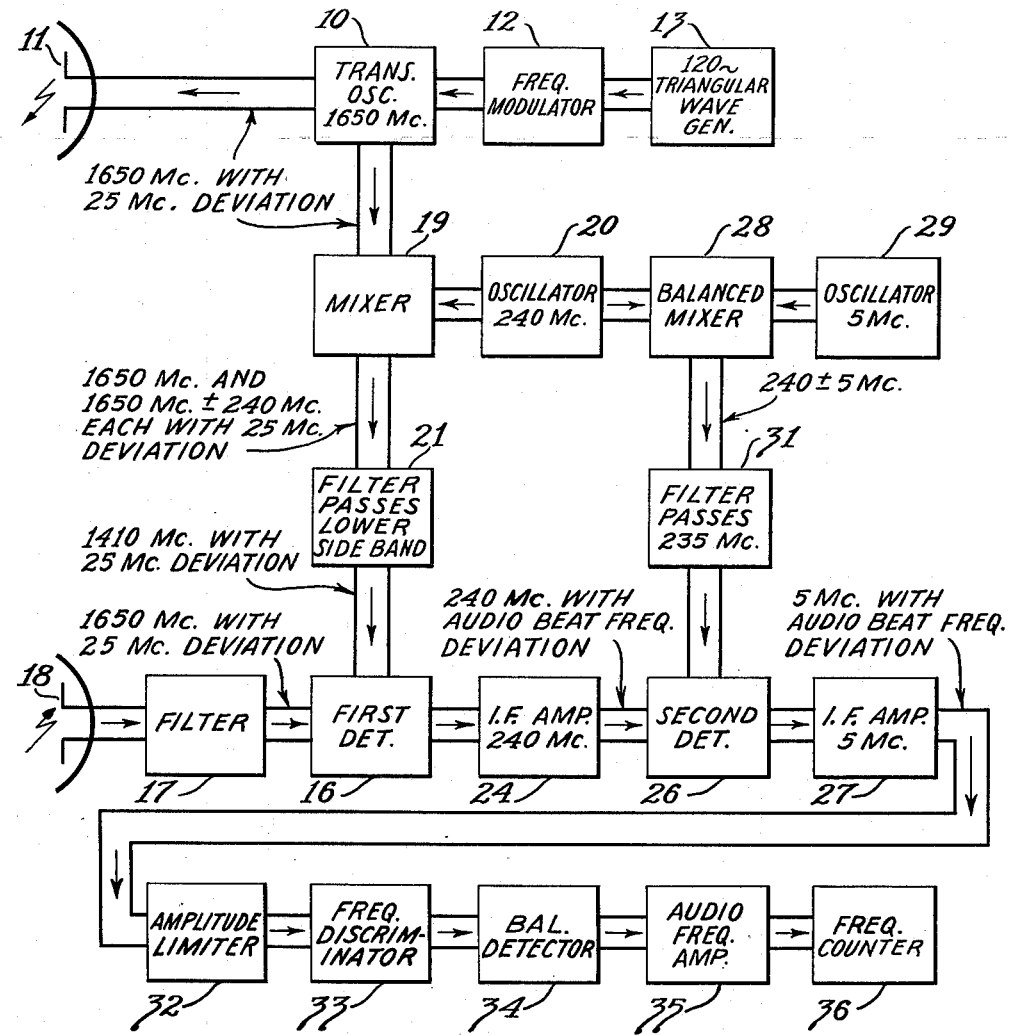

2,518,864

UNITED STATES PATENT OFFICE 2,518,864

FREQUENCY MODULATION RADAR SYSTEM OF SUPERHETERODYNE TYPE WITH SUCCESSIVE INTERMEDIATE - FREQUENCY SIGNAL CONVERSIONS

Wendell L. Carlson, Princeton, N. J., assignor to Radio Corporation of America, a corporation of Delaware Application March 9, 1946, Serial No. 653,259

5 Claims. (Cl. 343—14)

My invention relates to frequency-modulated radio altimeters or radar systems and particularly to radio altimeters or radar systems of the superheterodyne type.

In the earlier FM altimeters or radar systems the signal reflected from the earth or from a target was received and supplied to a detector where it was mixed with signal supplied directly from the transmitter to produce an audio frequency beat signal, the frequency of the best signal being a function of the distance to the reflecting object. In my copending application Serial No. 507,221, now Patent No. 2,466,532, issued April 5, 1949, filed October 20, 1943 and entitled Superheterodyne Radio Altimeter or Locator, there is described a system that differs from these earlier systems in that it is designed to provide an intermediate-frequency signal at the output circuit of the first detector. The I.-F. signal is then converted to the desired audio frequency beat signal preferably by means of an amplitude modulation detector. While it might be expected that a frequency discriminator would be satisfactory in such a system for obtaining the audio beat signal, this is not the case because of the small percentage variation in the I.-F. signal. Consequently, the combination of amplitude limiting and frequency discriminating cannot be employed satisfactorily in the system of my copending application for avoiding difficulties caused by undesired amplitude modulation on the signal.

It is an object of the present invention to provide an improved frequency-modulated radar or altimeter system of the superheterodyne type in which a frequency discriminator may be utilized efficiently for obtaining the audio frequency beat signal.

A further object of the invention is to provide an improved frequency-modulated distance measuring system of the superheterodyne type.

A still further object of the invention is to provide an improved method of and means for utilizing frequency-modulated radio waves for determining the distance to a reflecting object.

A still further object of the invention is to provide an improved method of and means for reducing the undesired effects of amplitude modulation on the signal in a frequency-modulated distance determining system.

In accordance with one embodiment of the invention, a frequency-modulated radar system is provided with a local oscillator having a comparatively high frequency output that is mixed with the frequency-modulated signal from the transmitter to obtain a frequency-modulated side-band signal. The local oscillator frequency is high enough so that the said side-band signal can be separated from the transmitter carrier frequency by filtering. The side-band signal is then applied to the first detector of the receiver whereby an I.-F. output signal is obtained. The I.-F. signal is amplified and then reduced in frequency by mixing it with a signal derived from said local oscillator and from another local oscillator operating at the desired low intermediate frequency. The resulting low frequency I.-F. signal is then passed through an amplitude limiter to remove any amplitude modulation that may be present, and it is then passed through a frequency discriminator circuit and detector to obtain the desired audio frequency signal which has a frequency that is a function of the distance to the wave reflecting object. The audio frequency signal may be supplied to a frequency counter or to any other suitable frequency indicator.

The invention will be better understood from the following description taken in connection with the accompanying drawing in which the single figure is a block diagram of one embodiment of the invention.

Referring to the drawing, there is shown an embodiment of the invention applied to a frequency-modulated altimeter or radar system comprising a high frequency transmitter oscillator 10 which is cyclically frequency modulated in the usual manner for supplying a frequency-modulated carrier wave signal to a transmitter antenna 11. The desired frequency modulation may be produced by means of a suitable modulating unit 12, such as a variable capacity unit, that is driven by a cyclically recurring wave supplied by a wave generator 13. The output of the generator 13 may be a wave of any suitable wave form such as a triangular wave, a sawtooth wave or a sine wave. Merely by way of example, it is assumed that the carrier wave frequency is 1650 megacycles per second, that the frequency swing or deviation produced by modulator 12 is 25 megacycles, and that the modulator 12 is driven by a triangular wave recurring at a rate of 120 per second.

The system also comprises a first detector or mixer 16 which is supplied through a filter 17 with the signal picked up by an antenna 18 after it has been reflected from the earth's surface or from an object or objects to be located.

According to the embodiment of the invention shown in the drawing, side-band signals of the transmitter carrier wave signal are produced in a mixer 19 by supplying to the mixer 19 both signal from the transmitter oscillator 10 and signal from an oscillator 20. One of the side bands (the lower one in the example illustrated) is supplied through a filter 21 to the first detector 16, where it is mixed with the reflected signal picked up by the antenna 18. In the example illustrated, the 1650 mc. carrier wave direct from the transmitter is mixed with 240 mc. signal from the oscillator 20 to obtain a 1410 mc. lower side-band signal. It will be understood that this 1410 mc. side-band signal contains the 25 mc. deviation.

In the first detector 16, the 1410 megacycle signal supplied from filter 21 and the reflected 1650 megacycle signal supplied from the filter 17 (both containing the 25 megacycle deviation) are mixed or heterodyned whereby a signal having their difference frequency appears in the mixer output, the difference frequency being normally 240 megacycles. The 1410 mc. signal should dominate all other signal voltages at the detector 16. The 240 mc. I.-F. signal has a frequency deviation corresponding to the elapsed time required for the signal to travel to the reflecting object and return. This modulation results from the frequency or phase difference of the two signals being heterodyned in the mixer 16; the amount of frequency or phase difference depending upon the propagation time of the wave that travelled from the transmitter to the reflecting object and back to the receiver.

It should be noted that if any substantial amount of 1650 mc. carrier frequency signal gets through the filter 21, the time delay should be substantially the same as for the 1410 mc. signal. Also, signals leaking across from the transmitting antenna 11 to the receiving antenna 18 should have the same delay as signals coming down through the path 19, 21. This can be assured by properly designing the filter 17.

The 240 megacycle I.-F. signal is amplified in an I.-F. amplifier 24 which may be designed to have good selectivity since the I.-F. signal is not affected by the 25 megacycle deviation frequency or by frequency drift of the oscillator 10.

The 240 mc. I.-F. signal is reduced in frequency by supplying it to a second detector or mixer 26 where, according to the present example, it is mixed with a 235 mc. signal to produce a 5 mc. I.-F. signal that is amplified by an I.-F. amplifier 27. The above-mentioned 235 mc. signal is obtained by supplying to a balanced mixer or detector 28 both 240 mc. signal from the oscillator 20 and 5 mc. signal from an oscillator 29. The resulting lower side-band signal of 235 mc. is then passed through a filter 31 to the detector 26. The 5 mc. oscillator 29 should be stable in frequency, a characteristic that is not difficult to obtain at this comparatively low frequency. Any unavoidable frequency drift of the oscillator 20 will not affect the 5 mc. I.-F. signal as its frequency is determined by the frequency of oscillator 29.

The 5 mc. I.-F. signal is supplied from the I.-F. amplifier 27 to an amplitude limiter 32 which removes any undesired amplitude modulation that may be present. The output of the limiter 32 is then supplied to a frequency discriminator 33 and to a balanced detector 34 whereby there is obtained an audio frequency signal that varies in amplitude at the beat frequency rate. The audio frequency signal may be amplified by an amplifier 35 and applied to a frequency counter 36 or to any other suitable type of frequency indicator.

From the foregoing description, it will be apparent that unavoidable amplitude modulation, such as may be present on the 1650 mc. signal feeding directly from the transmitter antenna to the receiver antenna, is eliminated by means of the amplitude limiter 32. It should be understood that the invention is not limited to the use of a separate amplitude limiter unit 32 as any other suitable means of removing the amplitude modulation may be employed. For example, the discriminator detector may be of a type that itself removes amplitude modulation.

I claim as my invention:

1. In a radio system for locating a reflecting object, a receiver including a first detector, transmitter means for producing a radio carrier wave signal, means for cyclically frequency modulating said carrier wave signal, means including a first oscillator for producing side band signals of said modulated radio wave signal, means for supplying one of said signals to said detector with said one signal substantially undelayed, means for supplying another of said signals to said detector by way of radiation to said reflecting object and reflection back to said receiver whereby an intermediate-frequency signal is obtained, means including a second detector for converting said first intermediate-frequency signal to a second intermediate-frequency signal of comparatively low frequency, said last converting means including a second oscillator and means for mixing its output signal with the output signal of the first oscillator for producing a heterodyning signal, and means for mixing in the second detector said heterodyning signal and said first intermediate-frequency signal, and means for discriminating against amplitude modulation of said second intermediate-frequency signal and converting said second intermediate frequency signal to a signal having a frequency that is a function of the distance to said reflecting object.

2. In a radio system for locating a reflecting object, a receiver including a first detector, transmitter means for producing a radio carrier wave signal, means including a first oscillator for producing side band signals of said radio wave signal, means for supplying one of said signals to said detector with said one signal substantially undelayed, means for supplying another of said signals to said detector by way of radiation to said reflecting object and reflection back to said receiver whereby an intermediate-frequency signal is obtained, means including a second detector for converting said first intermediate-frequency signal to a second intermediate-frequency signal of comparatively low frequency, said last converting means including a second oscillator and means for mixing its output signal with the output signal of the first oscillator for producing a heterodyning signal, and means for mixing in the second detector said heterodyning signal and said first intermediate-frequency signal whereby said second intermediate-frequency signal is obtained, means for converting frequency-modulated signals to amplitude-modulated signals, said second intermediate-frequency signal being supplied to said last means, and means for preventing said last means from responding to amplitude modulation.

3. In a radio system for locating a reflecting object, a receiver including a first detector, transmitter means for producing a radio carrier wave signal, means for cyclically frequency modulating said carrier wave signal, means including a first oscillator for producing side band signals of said modulated radio wave signal, means for supplying one of said signals to said detector with said one signal substantially undelayed, means for supplying another of said signals to said detector by way of radiation to said reflecting object and reflection back to said receiver whereby an intermediate-frequency signal is obtained, means including a second detector for converting said first intermediate-frequency signal to a second intermediate-frequency signal of comparatively low frequency, said last converting means including a second oscillator and means for mixing its output signal with the output signal of the first oscillator for producing a heterodyning signal, and means for mixing in the second detector said heterodyning signal and said first intermediate-frequency signal, means for amplitude limiting said second intermediate-frequency signal, and frequency discriminator and detector means for converting said amplitude limited signal to a signal having a frequency that is a function of the distance to said reflecting object.

4. In a radio system for locating a reflecting object, a receiver including a first detector, transmitter means for producing a radio carrier wave signal, means including a first oscillator for producing side band signals of said radio wave signal, means for supplying one of said signals to said detector with said one signal substantially undelayed, means for supplying another of said signals to said detector by way of radiation to said reflecting object and reflection back to said receiver whereby an intermediate-frequency signal is obtained, means including a second detector for converting said first intermediate-frequency signal to a second intermediate-frequency signal of comparatively low frequency, said last converting means including a second oscillator and means for mixing its output signal with the output signal of the first oscillator for producing a heterodyning signal, and means for mixing in the second detector said heterodyning signal and said first intermediate-frequency signal whereby said second intermediate-frequency signal is obtained, and means for discriminating against amplitude modulation of said second intermediate-frequency signal and converting said second intermediate-frequency signal to a signal having a characteristic that is a function of the instantaneous frequency of said second intermediate-frequency signal.

5. In a radio system for locating a reflecting object, a receiver including a first detector, transmitter means for producing a radio carrier wave signal, means including a first oscillator for producing side band signals of said radio wave signal, means for supplying one of said signals to said detector with said one signal substantially undelayed, means for supplying another of said signals to said detector by way of radiation to said reflecting object and reflection back to said receiver whereby an intermediate-frequency signal is obtained, means including a second detector for converting said first intermediate-frequency signal to a second intermediate-frequency signal of comparatively low frequency, said last converting means including a second oscillator and means for mixing its output signal with the output signal of the first oscillator for producing a heterodyning signal, and means for mixing in the second detector said heterodyning signal and said first intermediate-frequency signal whereby said second intermediate-frequency signal is obtained, a circuit including means for discriminating against amplitude modulation of said second intermediate-frequency signal and including a frequency-discriminator, and means applying said second intermediate-frequency signal to said circuit.

WENDELL L. CARLSON.

REFERENCES CITED

The following references are of record in the file of this patent:

UNITED STATES PATENTS

| Number | Name | Date |
|---|---|---|
| 1,774,493 | Washington | Aug. 26, 1930 |
| 2,236,893 | Chaffee | Apr. 1, 1941 |
| 2,268,643 | Crosby | Jan. 6, 1942 |